United States Patent
Zuber et al.

(10) Patent No.: US 6,309,772 B1
(45) Date of Patent: Oct. 30, 2001

(54) MEMBRANE-ELECTRODE UNIT FOR POLYMER ELECTROLYTE FUEL CELLS AND PROCESSES FOR THEIR PREPARATION

(75) Inventors: Ralf Zuber, Grossostheim; Knut Fehl, Schlüchtern; Karl-Anton Starz, Rodenbach; Udo Stenke, Mainaschaff, all of (DE)

(73) Assignee: Degussa AG, Hanau (DE)

( * ) Notice: Subject to any disclaimer, the term of this patent is extended or adjusted under 35 U.S.C. 154(b) by 0 days.

(21) Appl. No.: 09/274,018

(22) Filed: Mar. 22, 1999

(30) Foreign Application Priority Data

Mar. 23, 1998 (DE) ............................................... 198 12 592

(51) Int. Cl.[7] .................................................. H01M 8/10
(52) U.S. Cl. ................................. 429/33; 429/42; 429/44; 429/40; 427/209; 427/384; 427/372.2; 106/122
(58) Field of Search ................................. 429/33, 42, 44, 429/40; 427/209, 384, 372.2; 106/122

(56) References Cited

U.S. PATENT DOCUMENTS

| | | | |
|---|---|---|---|
| 4,876,115 | 10/1989 | Raistrick | 427/115 |
| 5,211,984 | 5/1993 | Wilson | 427/115 |
| 5,234,777 | 8/1993 | Wilson | 429/33 |
| 5,415,888 | 5/1995 | Banerjee et al. | 427/125 |
| 5,620,807 | * 4/1997 | Mussell et al. | 429/33 |
| 5,869,201 | * 2/1999 | Maschetti | 429/30 |

FOREIGN PATENT DOCUMENTS

| | | | |
|---|---|---|---|
| 19602629 | 8/1996 | (DE) | H01M/8/10 |
| 19606612 | 8/1997 | (DE) | H01M/4/88 |
| 19611510 | 9/1997 | (DE) | H01M/4/86 |
| 0577291 | 1/1994 | (EP) | H01M/8/10 |

* cited by examiner

Primary Examiner—Nam Nguyen
Assistant Examiner—Steven H. VerSteeg
(74) Attorney, Agent, or Firm—Smith, Gambrell & Russell, LLP

(57) ABSTRACT

A membrane-electrode unit for polymer-electrolyte fuel cells. The membrane-electrode unit consists of a polymer electrolyte membrane and porous reaction layers applied to both sides comprising a catalyst and a proton-conducting polymer, a so-called ionomer. The membrane-electrode unit is characterized in that one part A1 of the catalyst of the reaction layers is saturated with the ionomer and is embedded in the ionomer whereas one part A2 of the catalyst is kept free from the ionomer, where the parts A1 and A2 are in a weight ratio of 1:1 to 20:1.

29 Claims, 3 Drawing Sheets

MEMBRANE-ELECTRODE UNIT FOR POLYMER ELECTROLYTE FUEL CELLS AND PROCESSES FOR THEIR PREPARATION

INTRODUCTION AND BACKGROUND

The present invention relates to fuel cells, in particular PEM fuel cells in which a solid polymer is used as an electrolyte.

Fuel cells convert a fuel and an oxidation agent in separate locations on two electrodes into current, heat and water. The fuel can be hydrogen or a hydrogen-rich gas, the oxidation agent oxygen or air. The process of energy conversion in the fuel cell is characterized by a particularly high efficiency. For this reason, fuel cells in combination with electric motors are acquiring increasing importance as alternatives for conventional internal-combustion engines.

On account of its compact design, its power density and its high efficiency, the so-called polymer-electrolyte fuel cell (PEM fuel cell) is suitable for use as an energy converter in motor vehicles.

The PEM fuel cell consists of a stack of membrane-electrode units (MEE) between which bipolar plates are disposed for gas supply and current conduction. A membrane-electrode unit consists of a polymer-electrolyte membrane that is provided on both sides with reaction layers, the electrodes. One of the reaction layers is devised as an anode for the oxidation of hydrogen and the second reaction layer as a cathode for the reduction of oxygen. So-called gas distribution structures made of carbon fiber paper or carbon cloth are applied to the electrodes that permit the reaction gases good access to the electrodes and a good conductance of the cell current. Anode and cathode contain so-called electrocatalysts that catalytically support the appropriate reaction (oxidation of hydrogen or reduction of oxygen). Preferred catalytically active components are the metals of the platinum group of the Periodic System of the Elements. In the main, so-called supported catalysts are used in which the catalytically active platinum group metals are deposited in highly disperse form on the surface of a conductive support material. The mean crystallite size of the platinum group metal used in this situation is about between 1 and 10 nm. Fine-particulate carbon blacks have proved effective as support materials.

The polymer-electrolyte membrane consists of proton-conducting polymer materials. These materials are hereinafter also referred to in abbreviated form as ionomers. A tetrafluoroethylene-flurovinylether copolymer with acid functions, in particular sulfonic acid groups, is advantageously used. A material of this kind is for example sold under the trade name NAFION® by E. I. du Pont. It is, however also possible to use other, in particular fluorine-free, ionomer materials, such as sulfonated polyether ketones or aryl ketones or polybenzinidazoles.

U.S. Pat. No. 4,876,115 describes a process for the treatment of a porous gas diffusion electrode that has a catalyst loading of less than 0.5 mg/cm$^2$ on carbon particles. The electrode is impregnated with a solution of a proton-conducting material. This coats the surfaces of the carbon particles with the proton-conducting material.

U.S. Pat. No. 5,234,777 proposes a membrane-electrode unit that consists of a polymer-electrolyte membrane and a composite layer of a supported platinum catalyst and an ionomer. This layer is characterized in that it is less than 10 µm thick and the supported platinum catalyst is evenly dispersed in the proton-conducting ionomer. The platinum loading of the electrodes is less than 0.35 mg/cm$^2$. The electrode layers are attached to the polymer-electrolyte membrane.

Various processes are described to prepare the membrane-electrode units according to U.S. Pat. No. 5,234,777. In one embodiment, the Pt/C supported catalyst is dispersed in an alcoholic solution of the ionomer. This dispersion, also termed "ink," is applied to a PTFE carrier foil (PTFE: polytetrafluorethylene), dried and laminated by hot pressing onto the opposing sides of a polymer-electrolyte membrane.

In another embodiment the polymer-electrolyte membrane is directly coated with an ink of a Pt/C supported catalyst and a solution of an ionomer. The applied layer is dried at least at 150° C.

The reaction layers according to U.S. Pat. No. 5,234,777 are characterized by a homogeneous distribution of the catalyst in the ionomer. The hot pressing produces dense and pore-free layers of less than 10 µm, advantageously 5 µm thickness, with platinum loadings of less than 0.35 mg Pt/cm$^2$. In the case of the membrane-electrode units according to U.S. Pat. No. 5,234,777, access of the reaction gases to the catalyst is limited because of the dense, pore-free reaction layer. This has a negative effect on the electrochemical performance of the PEM cell, in particular during operation with dilute gases such as air or reformed gas. The possible use of air and reformed gas in place of oxygen and hydrogen is, however, an important prerequisite for the economic use of fuel cells in motor vehicles.

Another disadvantage of the process described in U.S. Pat. No. 5,234,777 is the high drying temperature of at least 150° C. Under these conditions, solvent vapors can ignite at the catalyst layer and destroy the membrane-electrode unit.

DE 196 02 629 A1 proposes a process for the preparation of a membrane-electrode unit in which a precious metal catalyst on carbon support is used to which the ionomer is adsorbed as colloid. For this purpose a colloid solution of the isomer is prepared in a suitable organic solvent and the carrier catalyst treated therewith. The carrier catalyst coated with the colloid is worked into an ink and used to prepare an electrode that is pressed onto the polymer-electrolyte membrane.

The membrane-electrode units prepared according to DE 196 02 629 A1 do not, however, display improved access for the reaction gases to the catalyst. Furthermore, it is very difficult to achieve a defined and reproducible distribution of the ionomer in colloidal form on the supported catalyst. The stability of the colloid ionomer is limited. The transfer of the process into mass production is therefore only possible to a limited extent.

EP 0 797 265 A1 describes a membrane-electrode unit for PEM fuel cells with a high total porosity and improved electrochemical performance. The high porosity is achieved by using pore formers in combination with a special spray process. The process has the disadvantage that the pore former leads to contamination and additional steps are needed to remove the pore former from the membrane-electrode unit.

The widespread commercial use of PEM fuel cells in motor vehicles calls for further improvement in the electrochemical cell performance and a marked reduction in system costs that are largely caused by the platinum group metals needed. To reduce the costs per kilowatt of installed performance it is therefore necessary to reduce the loading of the electrodes of a PEM fuel cells with the platinum group metals. For this purpose it is necessary to further improve the electrocatalysts and to utilize them more effectively.

It was therefore the object of the present invention to provide an improved membrane-electrode unit and processes for their preparation that avoid the described disadvantages of the state of the art. In particular it was an object to simplify gas transport in the reaction layer and thus to permit improved access of the reaction gases to the catalyst.

SUMMARY OF THE INVENTION

The above and other objects of the invention can be achieved by a membrane-electrode unit for polymer-electrolyte fuel cells that comprises a polymer-electrolyte membrane with porous reaction layers of catalyst and ionomer applied to both sides. The membrane-electrolyte unit is characterized in that the reaction layers comprise an inhomogeneous microstructure that is formed from a part A1 of the catalyst saturated with ionomer and embedded in the ionomer and the remaining part A2 of the catalyst that is kept free of the ionomer, where the parts A1 and A2 are in a weight ratio of 1:1 to 20:1, advantageously 3:1 to 10:1.

The microstructure of the membrane-electrode unit of the invention is formed from the two different catalyst parts A1 and A2 that are mixed together. The two catalyst parts are evenly distributed over the appropriate reaction layer. There is therefore no macroscopic inhomogeneity, such as for example in the form of a different concentration gradient for both parts of the catalyst over the thickness of the reaction layer. Instead, the inhomogeneity consists in the fact that the differently composed catalyst particles (with and without embedding in ionomer) are mixed together and there is thus an inhomogeneity in the close proximity of the catalyst particles.

The inhomogeneous microstructure permits a very good access and discharge of the reaction gases via the catalyst particles kept free of ionomers, as well as a low loss conductance of the proton stream via the particles saturated with ionomer. The characteristics of the reaction layer can be optimized by selecting the weight proportions A1 and A2.

BRIEF DESCRIPTION OF DRAWINGS

The present invention will be further understood with reference to the accompanying drawings, wherein.

DETAILED DESCRIPTION OF INVENTION

Figure 1:
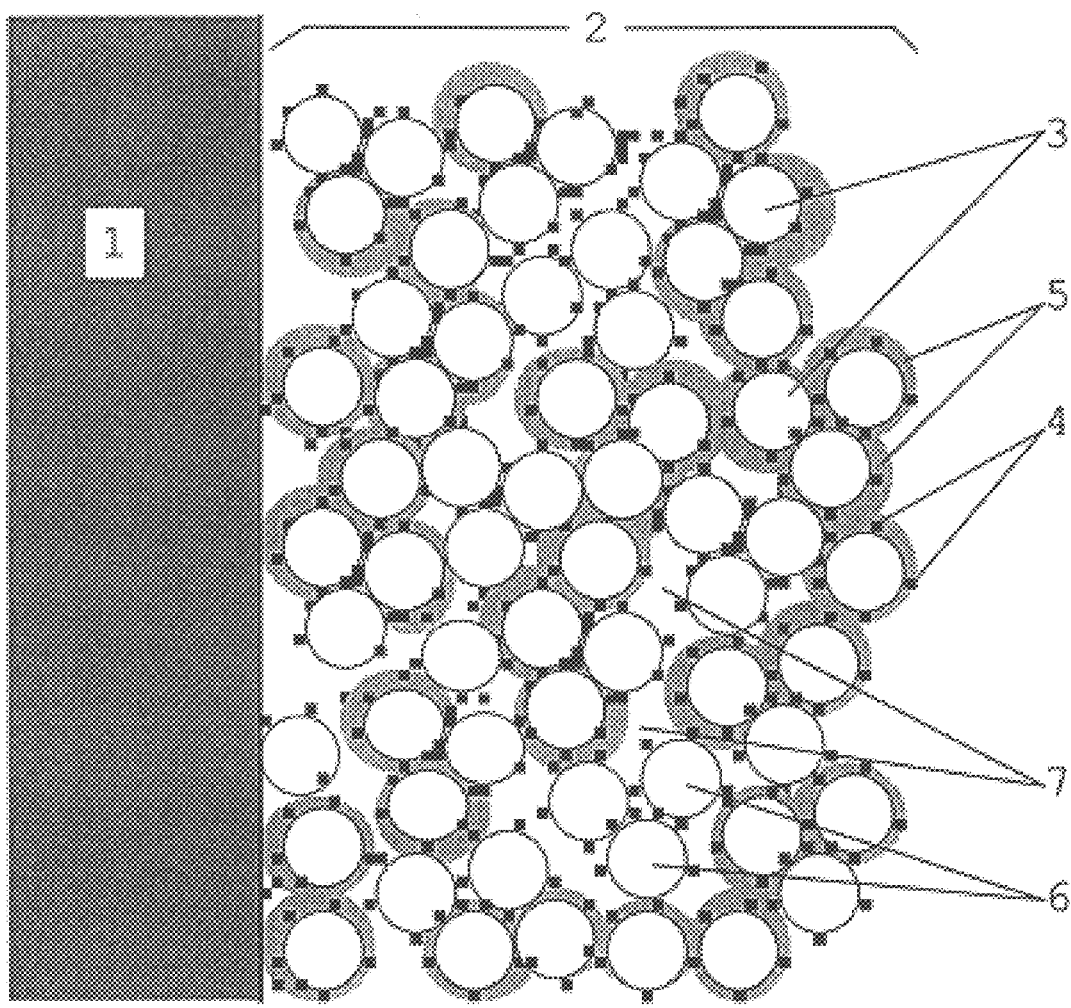
FIG. 1 is a schematic cross section of the structure of the reaction layers of the invention.

The present invention will now be described in greater detail.

A process composed of the following steps is used to prepare the membrane-electrode unit of the invention:

a) preparation of an ink A by dispersing the part A1 of the catalyst in a solution of an ionomer in a solvent A, b) preparation of an ink B by dispersing the part A2 of the catalyst in a solvent B, c) combination of ink A and ink B to form a joint ink C, d) homogenization of ink C, e) coating of the polymer-electrolyte membrane with ink C and f) drying the coating, wherein solvents A and B are chosen to be not miscible with one another and the ionomer does not dissolve in solvent B.

The special structure of the membrane-electrode unit is thus based on the use of an ink C that is formed by combining and carefully homogenizing the two inks A and B. The catalyst part A1 in ink A is saturated with ionomer. In contrast, the catalyst part A2 in ink B does not come into contact with ionomer. This also remains the case after the two inks have been combined, since the solvents A and B are not miscible with one another and, in addition, the ionomer is insoluble or only very poorly soluble in solvent B.

As the inks dry, the solvents evaporate and leave a highly porous reaction layer behind. The pore volume of the reaction layers prepared in this manner lies between 0.7 and 1.3, advantageously between 0.8 and 1.2 ml/g, for pores of diameters between 0.03 to 1 $\mu$m. As the solvents evaporate the ionomer is solidified and is thereby prevented from contacting the catalyst particles of catalyst part A2. The solvent of the ink B, therefore, ensures that the amount of catalyst contained therein is kept free from contact with the ionomer in the finished reaction layer.

In step a) of the process the proposed part A1 of the catalyst is dispersed in a solution of the ionomer. In so doing, the catalyst is saturated by ionomer. Solvent A must display good solubility for the ionomer. The ionomer is dissolved in a concentration of 1 to 10% by weight, related to the total weight of the solution, dissolved in solvent A.

It follows that the correct choice of solvent is critical for the process. The choice depends on the ionomer which should be used for the reaction layers. The following information on possible solvents applies in the event that a tetrafluoroethylene-fluorovinylether copolymer with acid groups is used as ionomer. As stated at the outset, a material of this nature is available under the trade name NAFION®. If a different ionomer is to be used, different solvents should under certain circumstances be used that meet the requirements of the process. In this case the requirement that solvents A and B should not be miscible admits miscibility to a slight extent if this means that the structure of the achievable reaction layers deviates only insignificantly from the structure of the invention. The same applies to the requirement that solvent B should not display any solubility for the ionomer.

Mono and multivalent alcohols, glycols as well as glycolether alcohols and glycolethers with an evaporation number (EN) greater than 600, advantageously greater than 800, may be used as solvent A. The evaporation number is determined according to DIN 53170 which is incorporated herein by reference. EN is a relative value. The EN of diethylether serves as reference value. An evaporation number in excess of 600 means that the solvent is suitable for screen printing processes. Examples of suitable solvents are propylene glycol, dipropylene glycol, glycerin, hexylene glycol and others.

Non-polar hydrocarbons or weakly polar solvents are used as solvent B that do not display any solubility for the ionomer used in ink A and that are not miscible with solvent A. Examples are long-chain paraffins such as Shell-Sol D70 or long-chain aliphatic carboxylic acid esters such as dodecanic acid methylester (methyldodecanoate) or decanic acid ethyl ester (ethyldecanoate). These materials, too, must be suitable for screen printing processes and display evaporation numbers (EN) greater than 600.

After combining ink A and ink B to ink C, ink C is homogenized. This is done using well known devices such as high-shear mixers, ultrasonic baths or three roller mills.

The homogenized mixture can be applied to the polymer-electrolyte membrane using various techniques. These include for example spraying, brushing, painting or printing.

The drying of the applied layer should occur at temperatures between 60 and 140, advantageously between 70 and 120° C. The reaction layers have layer thicknesses between 5 and 100 $\mu$m, advantageously between 10 and 100 $\mu$m. Below a thickness of 5 $\mu$m the layer becomes irregular on account of its porous structure. This results in a reduced electrical conductivity. Above 100 $\mu$m the electrochemical effectiveness of the reaction layer diminishes considerably. Layer thicknesses between 15 and 50 $\mu$m have proved particularly effective for the commonrest applications.

The proportion of the catalyst dispersed in ink B lies between 5 and 50% by weight, advantageously between 10 and 25% by weight, in each case related to the total weight of the catalyst (part A1+part A2).

The proportion of solvent B in the total amount of solvent in the mixed ink should lie between 5 and 35% by weight, advantageously between 10 and 25% by weight. An excessively large proportion of solvent B impairs the consistency of the ink. For the preparation of the membrane-electrode units of the invention the minimum proportion of solvent B should not fall below 5% by weight in order to ensure adequate wetting of the amount of catalyst contained in ink B.

It is possible to use as catalysts all the supported catalysts known in the field of fuel cells as well as also unsupported catalysts. In the case of supported catalysts, a fine-particulate, electrically conductive carbon is used as supported. Carbon blacks, graphite or active charcoal are advantageously used. The platinum group metals platinum, palladium and rhodiun or alloys thereof serve as catalytically active components. The catalytically active metals or metal alloys can also contain other alloying additions such as ruthenium, cobalt, chromium, tungsten, molybdenum, vanadium, iron, copper, nickel, etc. Depending on the layer thickness of the electrode, surface concentrations of metal of between 0.01 and 5 mg metal/cm$^2$ are possible in the reaction layers. For the preparation of the reaction layers it is possible to use platinum electro catalysts on carbon black (Pt/C) with 5 to 80% by weight of platinum, but also unsupported catalysts such as for example platinum black or platinum powder with a high surface area. Vulcan XC 72 carbon black manufactured by Cabot is frequently used as support.

The following examples illustrate the essential features of the invention. FIG. 1 shows the arrangement of the inhomogeneous microstructure of the reaction layers of the invention. (1) designates the polymer-electrolyte membrane. The reaction layer (2) is applied to this membrane. (3) and (6) designate the carbon supported particles and (4) the crystallites of the catalytically active metal components precipitated onto the supported particles. The carbon particles (3) belong to the catalyst part A1. They are saturated with ionomer and embedded in the ionomer, as illustrated by the ionomer cover (5) surrounding the particles (3). The carbon particles (6) belong to the catalyst part A2. They are neither saturated with ionomer nor embedded in the ionomer. Between the particles there are pores (7) that were left behind by the evaporating solvent B. The close proximity of different catalyst particles (with and without embedding in the ionomer) creates an inhomogeneous microstructure of the reaction layers.

Examples 1–4 describe the preparation of membrane-electrode units of the invention while comparative example CE1 shows the preparation of a membrane-electrode unit according to U.S. Pat. No. 5,234,777, protocol II. All membrane-electrode units were tested in a PEM fuel cell with an electrode area of 25 cm$^2$ in ambient pressure hydrogen/air operation (1bar/1bar absolute). The material used for gas distribution was carbon fiber paper of the type TGP-H-090/30% wet proof manufactured by ETEK Inc., Natick(USA).

Polymer electrolyte membranes can be present in an acidic, proton conducting H$^+$ form or after exchanging the protons for mono-valent ions such as for example Na$^+$ and K$^+$ in a non-acidic Na$^+$ or K$^+$ form. The non-acidic form of the polymer membranes is usually more resistant to temperature stresses than its acidic form.

In the following examples the proton-conducting materials were therefore used in their Na$^+$ form. In the last process step of the preparation the ionomers were converted again to the acidic, proton-conducting form by means of so-called re-protonation. The re-protonation occurred by treating the membrane electrode units in sulfuric acid.

Comparative Example 1 (CE1)

With reference to Protocol II of U.S. Pat. No. 5,234,777 an MEE was prepared as follows: a dispersion was prepared of 1 g Pt/C-catalyst (supported catalyst 20%Pt on Vulcan XC72), 10 g of a 5% Nafionâ solution in low-boiling alcohols (Aldrich, Karlsruhe), 3.3 g glycerol, 8.2 g water and 0.47 g 1 N NaOH solution. The mixture was dispersed in an ultrasonic bath. A Nafionâ 115 membrane in Na+ form was fixed to a heated plate. The mixture was applied to one side of the membrane and dried at 150° C. This procedure was repeated until the desired platinum loading of 0.25 mg Pt/cm2 was reached. The reverse side of the membrane was then coated in the same manner. Before use in the PEM fuel cell, the membrane coated with catalyst was reprotonated in 0.5 M sulfuric acid solution. The layer thickness of the electrode was 10 $\mu$m. The total loading of the membrane electrode unit with platinum was 0.5 mg/cm2.

EXAMPLE 1 (E1)

The following inks were prepared to prepare a membrane-electrode unit:

Ink A:

| | |
|---|---|
| Supported catalyst 20% Pt on Vulcan XC 72 | 24 g |
| NAFION ® solution (6.7% in propylene glycol) | 150.0 g |
| Sodium hydroxide solution (10%) | 3.0 g |

Ink B:

| | |
|---|---|
| Supported catalyst 20% Pt on Vulcan XC 72 | 6 g |
| Methyl dodecanoate | 40 g |
| Sodium hydroxide solution (10%) | 1 g |

EXAMPLE 2 (E2)

The following inks were prepared to prepare another membrane-electrode unit:

Ink A:

| | |
|---|---|
| Supported catalyst | 11.1 g |
| 20% Pt on Vulcan XC 72 | |
| NAFION ® solution | 74.0 g |
| (5.4% in Propylene glycol) | |
| Sodium hydroxide solution (10%) | 1.0 g |

Ink B:

| | |
|---|---|
| Carrier catalyst | 1.3 g |
| 20% Pt on Vulcan XC 72 | |
| Methyl dodecanoate | 16.3 g |
| Sodium hydroxide solution (10%) | 0.7 g |

EXAMPLE 3 (E3)

The following inks were prepared:

Ink A:

| | |
|---|---|
| Supported catalyst | 16.7 g |
| 20% Pt on Vulcan XC 72 | |
| NAFION ® solution | 164.0 g |
| (4.15% in Propylene glycol) | |
| Sodium hydroxide solution (10%) | 2.0 g |

Ink B:

| | |
|---|---|
| Supported catalyst | 4.1 g |
| 20% Pt on Vulcan XC 72 | |
| Methyl dodecanoate | 13.5 g |
| Sodium hydroxide solution (10%) | 0.5 g |

EXAMPLE 4 (E4)

The following inks were prepared to prepare another membrane-electrode unit:

Ink A:

| | |
|---|---|
| Supported catalyst | 10.8 g |
| 20% Pt on Vulcan XC 72 | |
| NAFION ® solution | 117.0 g |
| (3.8% in Propylene glycol) | |
| Sodium hydroxide solution (10%) | 1.5 g |

Ink B:

| | |
|---|---|
| Supported catalyst | 2.5 g |
| 20% Pt on Vulcan XC 72 | |
| Shellsol D70 (Shell) | 12.5 g |
| Sodium hydroxide solution (10%) | 0.5 g |

Inks A and B of Examples 1 to 4 were in each case combined to one ink C and carefully homogenized. The finished inks had the properties set out in Table 1:

TABLE 1

Properties of the finished inks C

| | Example | | | | |
|---|---|---|---|---|---|
| | 1 | 2 | 3 | 4 | |
| Viscosity | 1.3 | 1.5 | 0.43 | 1.8 | Pa · s |
| Proportion of solvent B in total amount of solvents A + B | 22.2 | 18.8 | 7.9 | 10.0 | % by wt |
| Proportion A2 of the catalyst dispersed in ink B, related to A1 + A2 | 20 | 10.5 | 19.7 | 18.8 | % by wt. |
| A1:A2 | 4:1 | 9:1 | 4:1 | 4.4:1 | |

The viscosity of the inks was measured using an RV20 Haake rotation viscosimeter RV20 at 100 s$^{-1}$.

The inks were printed in a screen printing process onto NAFION® 115 membranes in Na$^+$ form and dried at 110° C. The reverse side of the membranes was then coated with the catalyst ink in the same manner. Reprotonation occurred in 0.5 M sulfuric acid. The platinum loading per reaction layer in all the examples of the invention was 0.225 mg Pt/cm$^2$. This corresponds to a total platinum loading of the membrane-electrode unit of 0.45 mg/cm$^2$. The layer thicknesses were in the range between 20 and 25 µm.

Figure 4:
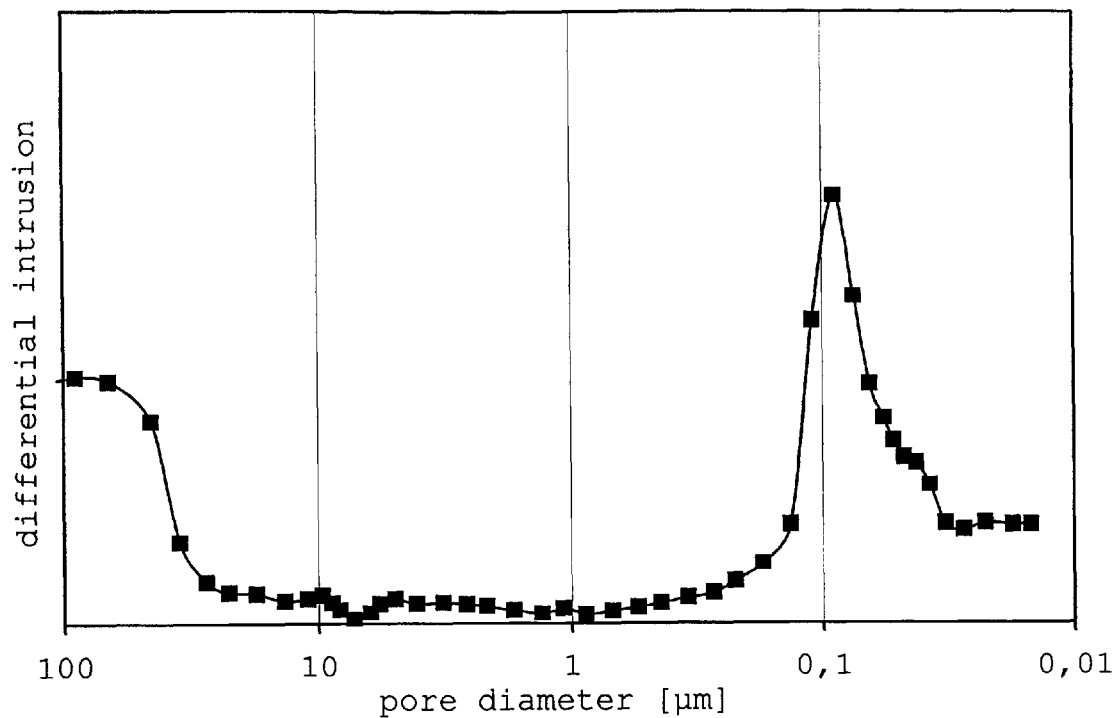
FIG. 4 is a porosimeter curve for comparative example 1.
Figure 5:
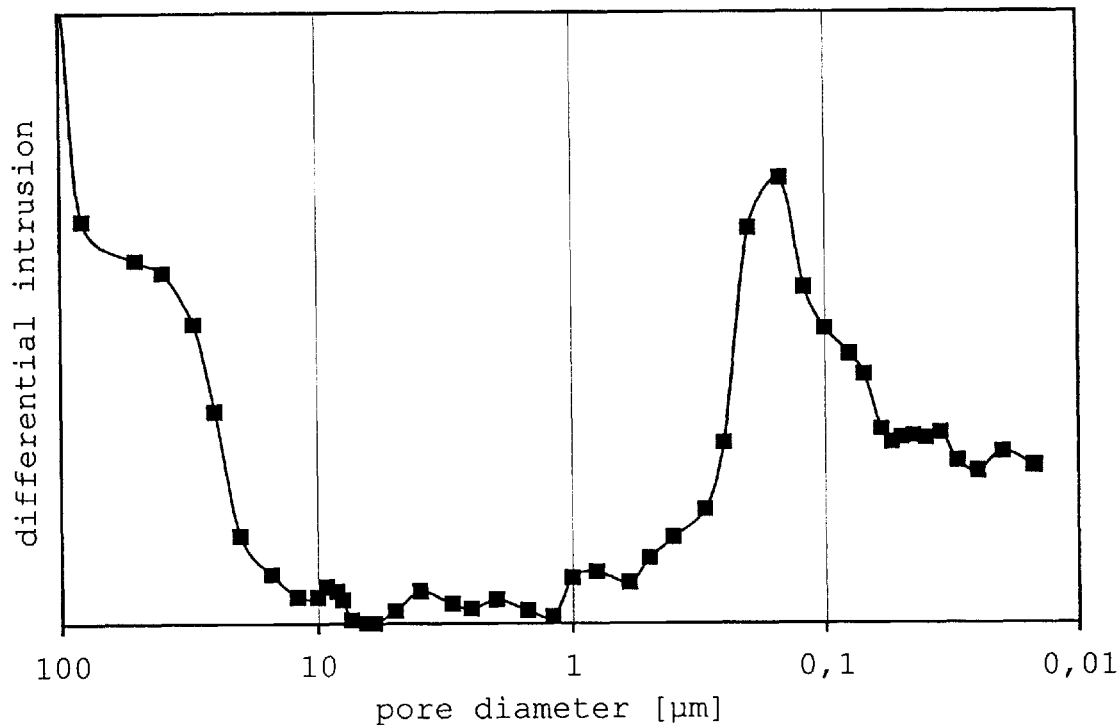
FIG. 5 is a porosimeter curve for example 3.

The pore distribution of the reaction layers was determined using mercury porosimetry. The reaction layers of the invention displayed a markedly larger pore volume compared to the reaction layers of Comparative example 1. The improved pore volume was reached without adding external pore formers. The pore volumes measured for Example 3 and Comparative example 1 are listed in Table 2. The reaction layers of the invention are characterized by a larger pore volume and by a different pore structure. The pore radii in the range of the maximum of the pore distribution are about twice as large in the reaction layers of the invention as in Comparative example 1. FIGS. 4 and 5 show the measured curves of the porosimeter measurements for the differential penetration of the mercury into the pores of the layers.

TABLE 2

Pore volumes and pore distribution

| Example | Pore volume d = 0.03 up to 1 µm [ml/g] | Maximum of the Pore distribution at [µm] |
|---|---|---|
| CE1 | 0.6 | 0.09 |
| B3 | 0.88 | 0.2 |

The inhomogeneous microstructure of reaction layers described in the present invention was investigated with XPS (X-ray photoelectron spectroscopy). This method yields information about the chemical composition and oxidation state within the uppermost atomic layers of the investigated surface.

Table 3 shows the binding energies of sulfur XPS bands found for the supported platinum catalyst and for the reaction layers of Example 1 and the Comparative example.

TABLE 3

| XPS-Data | Catalyst 20% Pt on Vulcan XC72 | Example 1 | Comparative Example 1 |
|---|---|---|---|
| Binding energy (eV) | 163,7 | 168,7/163,6 | 168,4 |

The sulfur band at 163,7 eV of the catalyst can be attributed to sulfane groups at the surface of Vulcan XC72 used as catalyst support. The band at 168,4 eV found for the membrane electrode assembly of the comparative example is due to the NAFION® SO₃H groups. No band of sulfane groups can be found in this case which indicates that the catalyst particles are completely covered with NAFION®. Contrary to that, the membrane electrode assembly of Example 1 shows both XPS-bands û the sulfane band of the catalyst support as well as the band of the NAFION® SO₃H groups. This clearly indicates that a considerable amount of the catalyst particles are not embedded in NAFION® as shown in FIG. 1 for catalyst particles 6.

Figure 2:
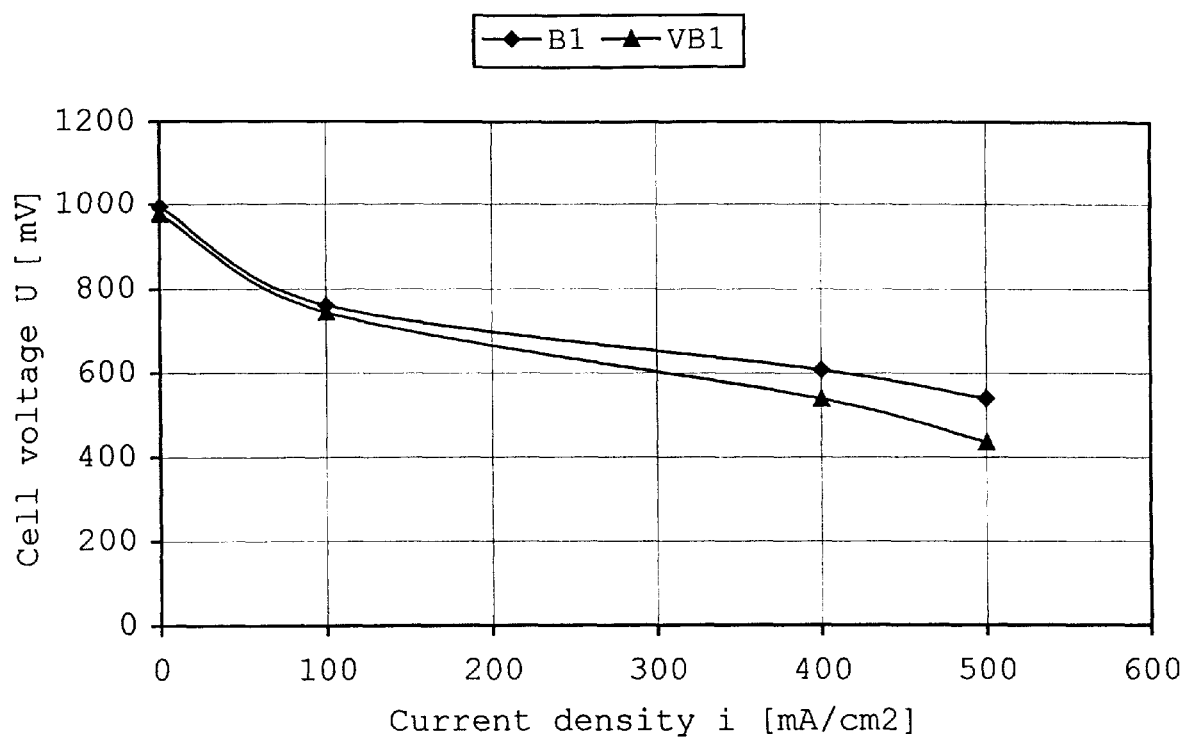
FIG. 2 is a graph of cell voltage as a function of the current density at air operation for the MEE of example 1 and comparative example 1.
Figure 3:
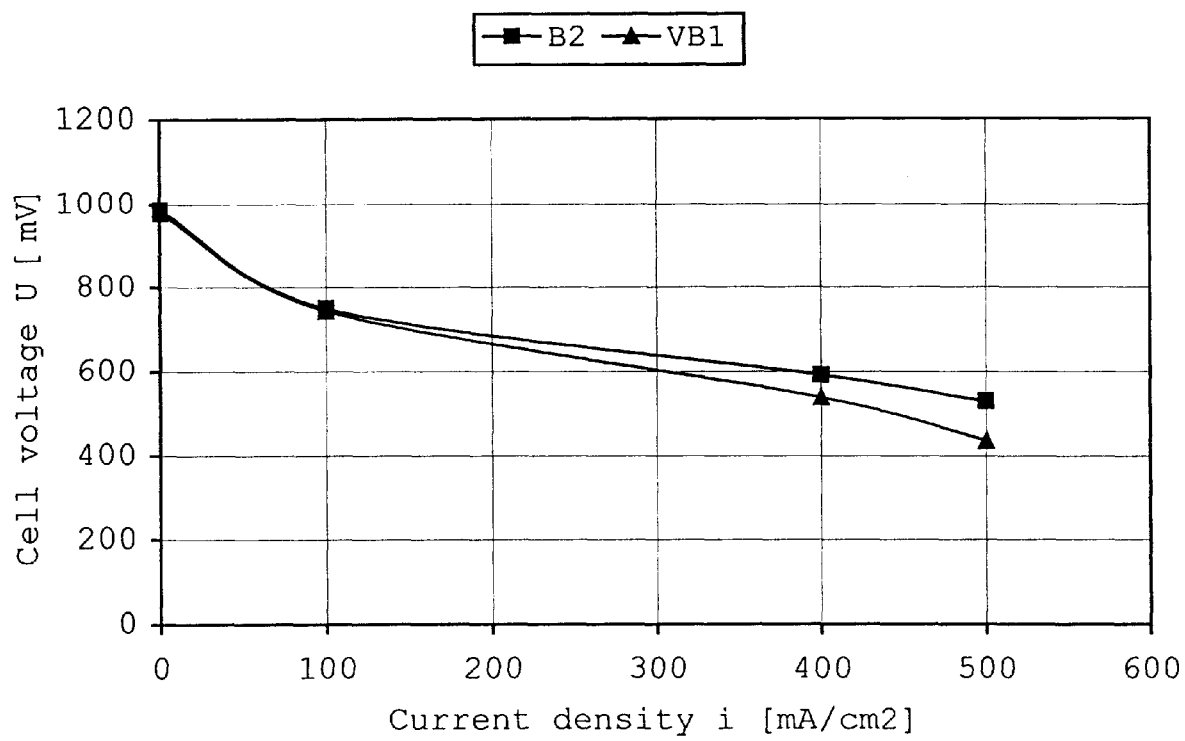
FIG. 3 is a graph of cell voltage as a function of the current density at air operation for the MEE of example 2 and comparative example 1.

The measured cell voltages in the hydrogen/air operation as a function of the current density are shown exemplary in FIG. 2 for the cells of Comparative example 1 and Example 1 and in FIG. 2 for the cells of Comparative example 1 and of Example 2. It can be seen that the membrane-electrode units of the invention provide a markedly improved electrical performance compared to the state of the art (CE 1).

Table 4 shows the cell voltages measured when the cells are loaded with a current density of 500 mA/cm².

TABLE 4

Cell voltages in the hydrogen/air operation at 500 mA/cm².

| Example | Cell Voltage [mV] |
|---|---|
| Comparative example 1 | 436 |
| Example 1 | 540 |
| Example 2 | 530 |
| Example 3 | 495 |
| Example 4 | 487 |

Further variations and modifications will be apparent to those skilled in the art from the foregoing and are intended to be encompassed by the claims appended hereto.

German priority application 198 12 592.5 is relied on and incorporated herein by reference.

We claim:

1. A membrane-electrode unit for polymer-electrolyte fuel cells comprising a polymer-electrolyte membrane having a porous reaction layer of catalyst and ionomer applied on each side of said membrane, wherein said reaction layer displays an inhomogeneous microstructure that is formed from a part A1 of said catalyst saturated with said ionomer and embedded in the ionomer, and a remaining part A2 of said catalyst that is free of the ionomer, the parts A1 and A2 being in a weight ratio of from 1:1 to 20:1.

2. The membrane-electrode unit according to claim 1, wherein said weight ratio is from 3:1 to 10:1.

3. The membrane-electrode unit according to claim 1, wherein the reaction layers display a pore volume between 0.7 and 1.3 ml/g for pores with diameters from 0.03 to 1 µm.

4. The membrane-electrode unit according to claim 3, wherein said pore volume is between 0.8 and 1.2 ml/g.

5. The membrane-electrode unit according to claim 4, wherein a layer thickness of the reaction layers is from 10 to 100 µm.

6. The membrane-electrode unit according to claim 5, wherein the catalyst is a platinum group metal black selected from the group consisting of platinum black, palladium black, rhodium black, and mixtures thereof.

7. The membrane-electrode unit according to claim 4, wherein the ionomer is a tetrafluoroethylene-fluorovinylether copolymer having acid groups.

8. The membrane-electrode unit according to claim 7, wherein the catalyst is a platinum group metal black selected from the group consisting of platinum black, palladium black, rhodium black, and mixtures thereof.

9. The membrane-electrode unit according to claim 4, wherein the catalyst of the reaction layers is a supported catalyst of a catalytically active metal, or metal alloy, on an electrically conductive carbon selected from the group consisting of carbon black, graphite and activated charcoal, wherein the catalytically active metal or metal alloy is present in a concentration of from 0.01 to 5 mg metal/cm² in the reaction layer.

10. The membrane-electrode unit according to claim 9, wherein the catalytically active metal or metal alloy is a metal or alloy of a platinum group metal selected from the group consisting of platinum, palladium, rhodium, and mixtures thereof.

11. The membrane-electrode unit according to claim 10, wherein the metal or metal alloy contains, as a further alloy component, a member selected from the group consisting of ruthenium, cobalt, chromium, tungsten, molybdenum, vanadium, iron, copper, nickel, and mixtures thereof.

12. The membrane-electrode unit according to claim 3, wherein a layer thickness of the reaction layers lies between 5 and 100 µm.

13. The membrane-electrode unit according to claim 12, wherein the ionomer is a tetrafluoroethylene-fluorovinylether copolymer having acid groups.

14. A process for preparing the membrane-electrode unit according to claim 1, which process comprises:

a) preparing an ink A by dispersing part A1 of a catalyst in a solution of an ionomer in a solvent A, b) preparing an ink B by dispersing a part A2 of the catalyst in a solvent B, c) combining ink A and ink B to form a joint ink C, d) homogenizing joint ink C, e) coating a polymer-electrolyte membrane with joint ink C, and f) drying the coating, wherein solvents A and B are not miscible in one another, and wherein the ionomer does not dissolve in solvent B.

15. The process according to claim 14, wherein the polymer in the membrane and the ionomer for the reaction layers are present in a non-acidic form, and are reconverted into an acidic form after the drying of the layers.

16. The process according to claim 15, wherein the ionomer is a tetrafluoroethylene-fluorovinylether copolymer having acid groups.

17. The process according to claim 16, wherein solvent A comprises a mono- or multivalent alcohol, glycol, glycolether alcohol, glycol ethers, or mixtures thereof.

18. The process according to claim 17, wherein solvent A displays an evaporation number of more than 600.

19. The process according to claim 18, wherein the evaporation number is more than 800.

20. The process according to claim 19, wherein solvent A is a member selected from the group consisting of propylene glycol, dipropylene glycol, glycerol, hexylene glycol, and mixtures thereof.

21. The process according to claim 20, wherein solvent B is a non-polar hydrocarbon or a weakly polar solvent.

22. The process according to claim 21, wherein solvent B comprises long-chain paraffins or long-chain aliphatic carboxylic acid esters.

23. The process according to claim 22, wherein solvent B has an evaporation number of more than 600.

24. The process according to claim 23, wherein the evaporation number is more than 800.

25. The process according to claim 24, wherein solvent B is selected from the group consisting of methyl dodecanoate and ethyl decanoate, and mixtures thereof.

26. The process according to claim 25, wherein the ionomer is dissolved in solvent A in a concentration of 1 to 10% by weight, related to a total weight of solvent A.

27. The process according to claim 26, wherein solvent B is used in an amount from 5 to 35% by weight, related to a total amount of solvents A and B.

28. The process according to claim 27, wherein solvent B is used in an amount from 10 to 25% by weight, related to the total amount of solvents A and B.

29. Ink for the preparation of a membrane-electrode unit according to claim 1, comprising a catalyst, an ionomer and an organic solvent, said ink formed of a mixture of two inks A and B, wherein ink A comprises a catalyst, and a solution of an ionomer in a solvent A, and ink B comprises a catalyst and a solvent B, wherein solvents A and B are not miscible with one another and the ionomer does not dissolve in solvent B.

* * * * *